US012025945B2

(12) United States Patent
Nakatsu et al.

(10) Patent No.: US 12,025,945 B2
(45) Date of Patent: Jul. 2, 2024

(54) IMAGE FORMING APPARATUS

(71) Applicant: CANON KABUSHIKI KAISHA, Tokyo (JP)

(72) Inventors: Haruhiko Nakatsu, Ibaraki (JP); Takuya Matsumura, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/180,359

(22) Filed: Mar. 8, 2023

(65) Prior Publication Data

US 2023/0305481 A1 Sep. 28, 2023

(30) Foreign Application Priority Data

Mar. 28, 2022 (JP) ................................ 2022-051622

(51) Int. Cl.
*G03G 21/16* (2006.01)

(52) U.S. Cl.
CPC ..... *G03G 21/1619* (2013.01); *G03G 21/1671* (2013.01); *G03G 21/1676* (2013.01); *G03G 21/1666* (2013.01); *G03G 2215/00177* (2013.01)

(58) Field of Classification Search
CPC ........... G03G 21/1619; G03G 21/1671; G03G 21/1676; G03G 21/1666; G03G 2215/00177
See application file for complete search history.

(56) References Cited

U.S. PATENT DOCUMENTS

2010/0014887 A1* 1/2010 Tomatsu ............ G03G 21/1619 399/107
2014/0376956 A1* 12/2014 Souda ................ G03G 21/1619 399/107

FOREIGN PATENT DOCUMENTS

JP 2002311364 A 10/2002

* cited by examiner

*Primary Examiner* — Sandra Brase
(74) *Attorney, Agent, or Firm* — ROSSI, KIMMS & McDOWELL LLP

(57) ABSTRACT

An image forming apparatus is disclosed, which includes an optical scanning portion which forms an electrostatic latent image on a photosensitive body; a placing member on which the optical scanning portion is placed; a first supporting member to which the placing member is fixed; a second supporting member opposite the first supporting member across the placing member; and a connecting member which connects the second supporting member and the placing member, the connecting member including a first surface which is fixed to the second supporting member and a second surface which is bent at an approximately right angle with respect to the first surface and is fixed to the placing member.

9 Claims, 11 Drawing Sheets

IMAGE FORMING APPARATUS

BACKGROUND OF THE INVENTION

Field of the Invention

This invention relates to an image forming apparatus such as a copying machine and a printer using the electrophotographic system or the electrostatic recording system.

Description of the Related Art

In a conventional image forming apparatus using the electrophotographic system or the electrostatic recording system, an optical scanning device that creates an electrostatic latent image on a photosensitive drum is placed on a stay provided on the frame of the image forming apparatus, as shown in Japanese Patent Application Laid-open No. 2002-311364. The stay on which a photosensitive drum is placed has two mounting surfaces which are right-angled to the placing surface of the optical scanning device and are opposed to each other. The stay is fixed with screws to the front and rear side plates which are extended in the vertical direction from the installation surface which is a part of the frame of the image forming apparatus.

However, when the stay for placing the optical scanning device on the front and rear side plates is fixed with screws in this manner, the stay may be deformed.

When the frame is assembled, the distance between the front side plate and rear side plate deviates from the design value by a certain amount due to dimensional variations of the parts including the front side plate and rear side plate and other parts.

Similarly, the distance between the mounting surfaces of the stay which are fastened and fixed to the frame varies by a certain amount due to manufacturing variations.

Generally, for ease of assembly, the distance between the front side plate and rear side plate is designed to be greater than the distance between the mounting surfaces of the stay.

As shown in FIG. 11, when the stay 91 is fastened and fixed with screws to the front side plate 92 and the rear side plate 93 with a gap between the front side plate 92 and the rear side plate 93, and the stay 91, the opposing mounting surfaces 91*b* and 91*c* of the stay 91 are pulled to the front side plate 92 and rear side plate 93, respectively. As a result, the placing surface 91*a* of the optical scanning device is deformed and the distance between the photosensitive body and the optical scanning device is changed.

In particular, when the image quality is placed important, an image forming apparatus with a smaller diameter spot of the light beam to be focused on the photosensitive body is used. In this type of image forming apparatus, the depth of field of the spot becomes shallower as the spot diameter becomes smaller. As a result, the image quality is affected by the distance shift between the optical scanning device and the photosensitive body.

SUMMARY OF THE INVENTION

A representative configuration of the present invention is an image forming apparatus comprising:

an optical scanning portion which forms an electrostatic latent image on a photosensitive body;

a placing member on which the optical scanning portion is placed;

a first supporting member to which the placing member is fixed;

a second supporting member opposite the first supporting member across the placing member; and a connecting member which connects the second supporting member and the placing member, the connecting member including a first surface which is fixed to the second supporting member and a second surface which is bent at an approximately right angle with respect to the first surface and is fixed to the placing member.

Further features of the present invention will become apparent from the following description of exemplary embodiments with reference to the attached drawings.

DESCRIPTION OF THE EMBODIMENTS

A detailed description of preferred embodiments of the present invention will be described with reference to the drawings. The elements of the configuration described in the following embodiments are only examples. Therefore, the configuration of the apparatus to which the present invention is applied, and the various conditions such as functions, dimensions, materials, shape, and relative arrangement thereof can be modified or changed as necessary to the extent not to depart from the intent of the invention, and they are not limited to the following embodiments.

Figure 1:
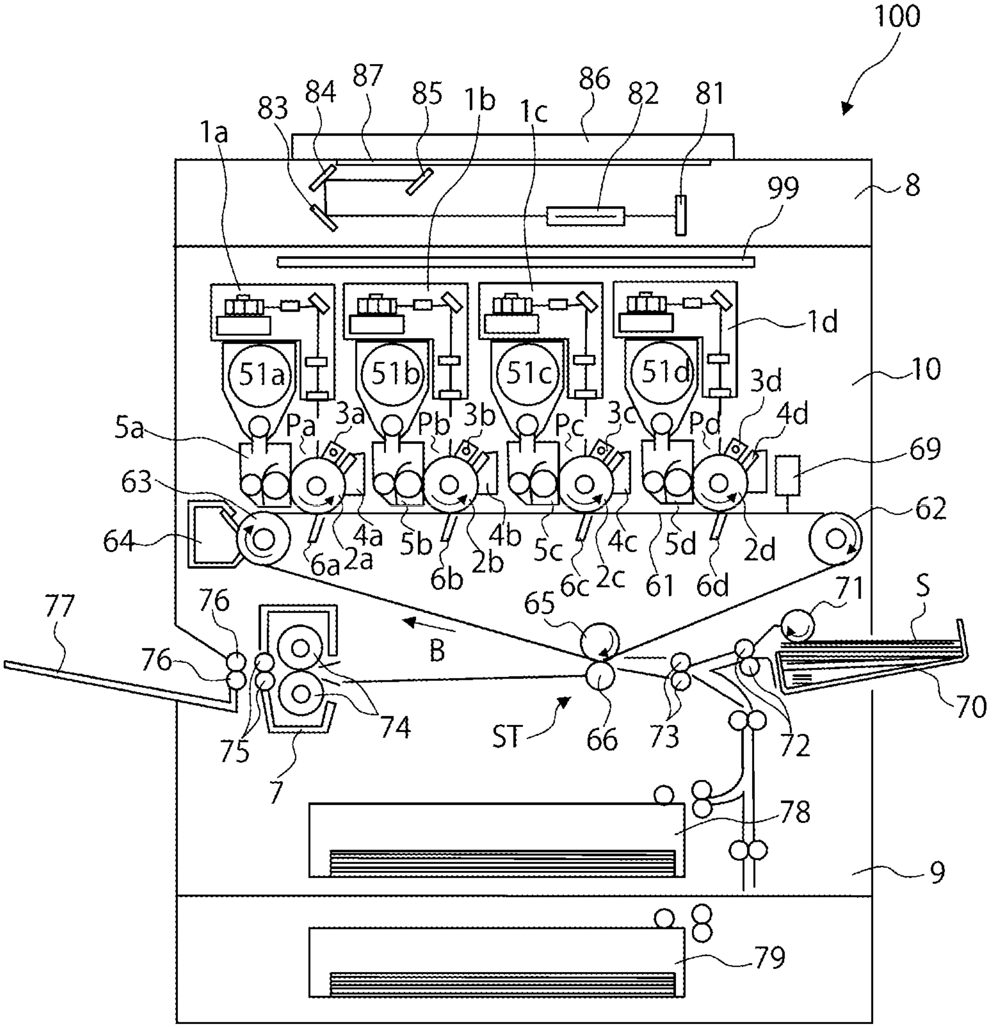
FIG. 1 is a diagram showing schematic front cross-sectional view of an image forming apparatus according to the first embodiment of the present invention.

FIG. 1 is a schematic front cross-sectional view of an image forming apparatus according to the first embodiment of the present invention.

As shown in FIG. 1, the image forming apparatus 100 includes the document reading portion 8, the image forming portion 10, and the feeding portion 9.

The document reading portion 8 reads an image of a document placed on the document base glass 87. The document reading portion 8 has the line sensor 81, the lens 82, mirrors 83, 84 and 85, and the pressing plate 86. The document placed on the document base glass 87 is pressed by the pressing plate 86. When an image of the document is read, the document is irradiated with light. The light reflected from the document is focused on the line sensor 81 by the lens 82 via the mirrors 85, 84 and 83 to form an image. The line sensor 81 converts the light reflected from the document into an electric signal which is input to the control portion (not shown) as image information.

The control portion controls the laser driving portions of the optical scanning devices 1*a*, 1*b*, 1*c*, and 1*d* as optical scanning portions (which will be described below) according to image information such that the optical scanning devices 1 output an optical beam (laser beam) which is modulated according to the image information.

The image forming portion 10 includes the four image forming stations Pa, Pb, Pc, and Pd, the intermediate transfer belt 61, and the fixing device 7. The image forming stations Pa, Pb, Pc, and Pd form cyan images, magenta images, yellow images, and black images, respectively. The image forming stations Pa, Pb, Pc, and Pd include the photosensitive drums 2*a*, 2*b*, 2*c*, and 2*d* as image bearing bodies, respectively. The directions of the rotation axes of the photosensitive drums 2*a*, 2*b*, 2*c*, and 2*d* are the same as the front and back directions of the image forming apparatus 100.

Around the photosensitive drums 2*a*, 2*b*, 2*c*, and 2*d*, the charging devices 3*a*, 3*b*, 3*c*, and 3*d*, the optical scanning devices 1*a*, 1*b*, 1*c*, and 1*d*, the developing devices 5*a*, 5*b*, 5*c*, and 5*d*, the primary transfer devices 6*a*, 6*b*, 6*c*, and 6*d*, and the drum cleaning devices 4*a*, 4*b*, 4*c*, and 4*d* are respectively located in these orders along the directions of rotation of the photosensitive drums 2*a*, 2*b*, 2*c*, and 2*d*.

The charging devices 3*a*, 3*b*, 3*c*, and 3*d* uniformly charge the surfaces of photosensitive drums 2*a*, 2*b*, 2*c*, and 2*d*.

The optical scanning devices 1*a*, 1*b*, 1*c*, and 1*d* irradiate the surfaces of the uniformly charged photosensitive drums 2*a*, 2*b*, 2*c*, and 2*d* with light beams modulated according to image information of respective colors, to form electrostatic latent images on the surfaces of the photosensitive drums 2*a*, 2*b*, 2*c* and 2*d*. Before the optical scanning devices 1*a*, 1*b*, 1*c*, and 1*d* are mounted, the adjustment of irradiation position in the rotational direction on the photosensitive drums 2*a*, 2*b*, 2*c*, and 2*d*, the adjustment of the deviations of the photosensitive drums 2*a*, 2*b*, 2*c*, and 2*d* from the generating lines, and adjustment of the focusing of the optical beams to focus on the photosensitive drums 2*a*, 2*b*, 2*c*, and 2*d* are performed using dedicated tools.

The developing devices 5*a*, 5*b*, 5*c*, and 5*d* develop the electrostatic latent images formed on the surfaces of the photosensitive drums 2*a*, 2*b*, 2*c*, and 2*d* with developer (toner) of respective colors to form toner images of respective colors.

The primary transfer devices 6*a*, 6*b*, 6*c*, and 6*d* transfer the toner images on the surfaces of the photosensitive drums 2 to the intermediate transfer belt 61.

The drum cleaning devices 4*a*, 4*b*, 4*c*, and 4*d* remove the toner remaining on the photosensitive drums 2*a*, 2*b*, 2*c*, 2*d* after transfer.

The developing devices 5*a*, 5*b*, 5*c*, and 5*d* include the developer containers 51*a*, 51*b*, 51*c*, and 51*d* which contain toner of their respective colors. The developer containers 51*a*, 51*b*, 51*c*, and 51*d* are cylindrical developer cartridges which can be detachably attachable to the apparatus body of the image forming apparatus 100. The toner is replenished from the developer containers 51*a*, 51*b*, 51*c*, and 51*d* to the developing devices 5*a*, 5*b*, 5*c*, and 5*d*.

The photosensitive drums 2*a*, 2*b*, 2*c*, and 2*d*, the charging devices 3*a*, 3*b*, 3*c*, and 3*d*, and the drum cleaning devices 4*a*, 4*b*, 4*c*, and 4*d* are respectively integrated to form process cartridges which are detachably attachable to the apparatus body of the image forming apparatus 100.

The intermediate transfer belt 61 which is an endless belt is placed under the photosensitive drums 2*a*, 2*b*, 2*c*, and 2*d*. The intermediate transfer belt 61 passes through the four image forming stations Pa, Pb, Pc, and Pd while being in contact with the four photosensitive drums 2*a*, 2*b*, 2*c*, and 2*d*. The intermediate transfer belt 61 is stretched and supported by the driving roller 62 and the driven rollers 63 and 65. The belt cleaning device 64 is positioned to face the driven roller 63. The belt cleaning device 64 can come into contact with and separate from the intermediate transfer belt 61. The belt cleaning device 64 removes toner remaining on the intermediate transfer belt 61 after the secondary transfer.

The feeding portion 9 includes the manual feed tray 70 and the feeding cassettes 78 and 79 containing sheet materials. The direction of drawing the feeding cassettes 78 and 79 is the one from the rear side to the front side of the image forming apparatus 100. The feeding portion 9 conveys sheet materials fed from the manual feed tray 70, the feeding cassette 78 or the feeding cassette 79 to the secondary transfer portion ST in synchronization with the timing of the toner image on the intermediate transfer belt 61 using the registration roller 73. The secondary transfer portion ST includes the driven roller 65 and the secondary transfer roller (transfer device) 66. In the secondary transfer portion ST, the toner image on the intermediate transfer belt 61 is transferred to the sheet materials.

The fixing device 7 has the fixing roller pair 74. The fixing roller pair 74 heats and pressurizes a sheet material on which toner images have been transferred to fix the toner image to the sheet material so that a full-color fixed image is obtained on the sheet material. The sheet material on which the full-color image has been formed is conveyed by the exit roller pair 75 of the fixing device 7 and discharged onto the discharge tray 77 by the discharge roller pair 76.

Figure 2:
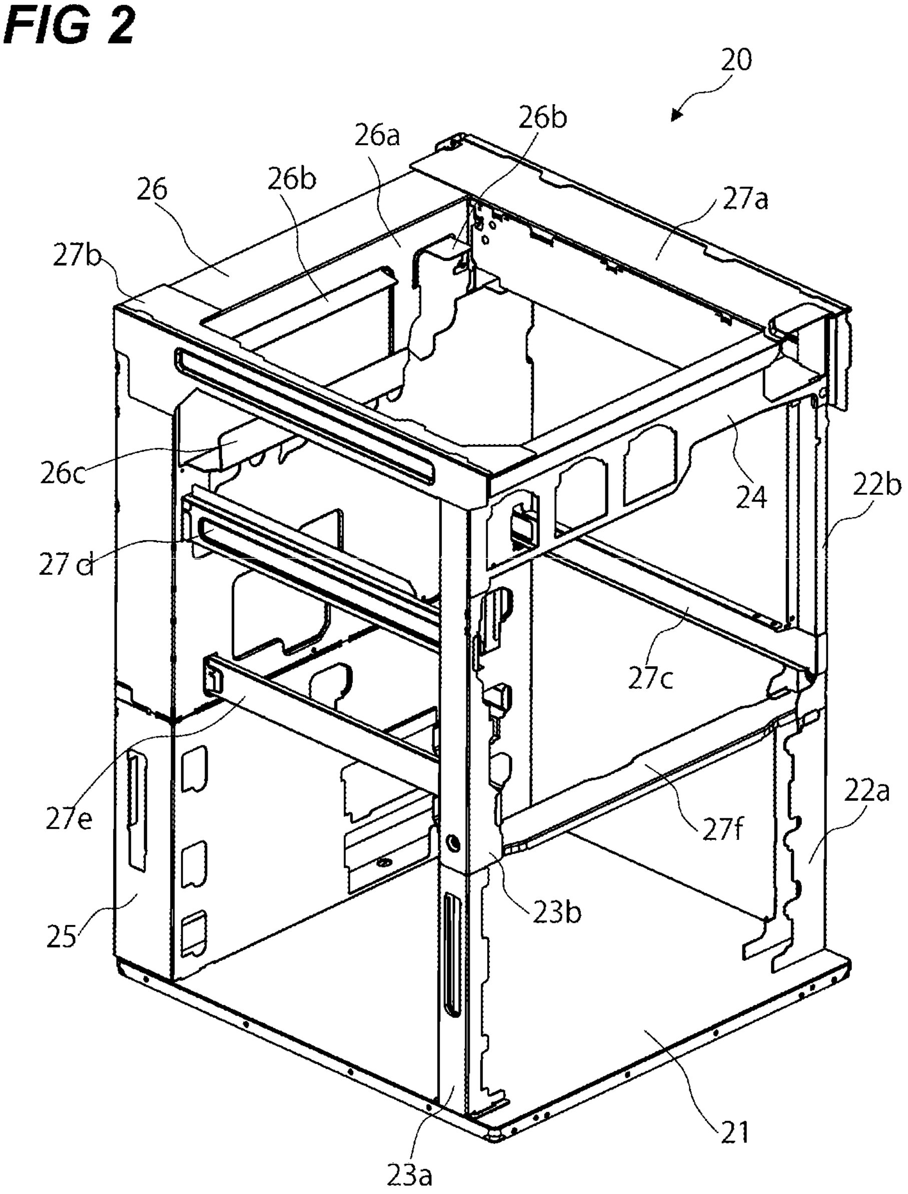
FIG. 2 is a diagram showing a perspective view of the frame of the image forming apparatus.

FIG. 2 is a diagram showing a perspective view of the frame 20 of the image forming apparatus 100 shown in FIG. 1 with the various units removed.

The frame 20 in FIG. 2 supports various units in the image forming apparatus 100, including the photosensitive drums 2*a*, 2*b*, 2*c*, and 2*d*, the charging devices 3*a*, 3*b*, 3*c*, and 3*d*, and the developing devices 5*a*, 5*b*, 5*c*, and 5*d*.

The bottom plate 21 is a combination of two steel plates which are fixed together. Each of the steel plates includes an upright wall portion made by drawing or bending around the entire circumference.

The bottom portion of the bottom plate 21 is provided at the four corners with casters, not shown, which allow the image forming apparatus 100 to be moved.

At the two corners of the upper surface of the bottom plate 21 on the front side of the frame 20, the struts 22*a* and 23*a* are provided such that they stand, and welded at their contact points with the bottom plate 21.

The struts 22*b* and 23*b* are welded to the struts 22*a* and 23*a* such that they extend upward from the struts 22*a* and 23*a*, respectively.

The front side plate 24 as a first supporting member is located at the upper portion of the front side of the frame 20 and is welded to the struts 22*b* and 23*b*, respectively.

On the upper surface of the bottom plate 21 on the rear side of the frame 20, the rear side plate 25 with a bending portion is provided such that it stands, and is welded to its contact point to the bottom plate 21.

The rear side plate 26 as a second supporting member is welded to the rear side plate 25 such that it extends upward from the rear side plate 25. The rear side plate 26 includes the plane portions 26*b* bent from the rear side plate 26 at an approximately right angle to the upright surface portion 26*a*. In this embodiment, the plane portions 26*b* are on a horizontal plane. In this embodiment, the "approximately right angle" allows an error of ±1° with respect to a right angle (the same applies to the other embodiments below). Thus, the plane portions 26*b* are bent at 89° to 91° with respect to the upright surface portion 26*a* (the same applies to the other plane portions below).

In this embodiment, two plane portions 26*b* are formed due to the configuration of the apparatus. However, two plane portions 26*b* may be integrated into one. The rear side plate 26 includes the vertical surface portion 26*c* bent from the upright surface portion 26*a*.

The beam members 27*a* and 27*b* include mainly L-shaped cross sections and are fixed to the struts 22*b* and 23*b*, and the rear side plate 26, respectively.

The beam members 27*c*, 27*d*, and 27*e* have a mainly squared U-shaped cross section and are fixed to the struts 22*b* and 23*b* and the rear side plate 26, respectively.

The beam member 27*f* is fixed to the struts 22*b* and 23*b* so that rigidity is maintained as the frame.

Figure 3:
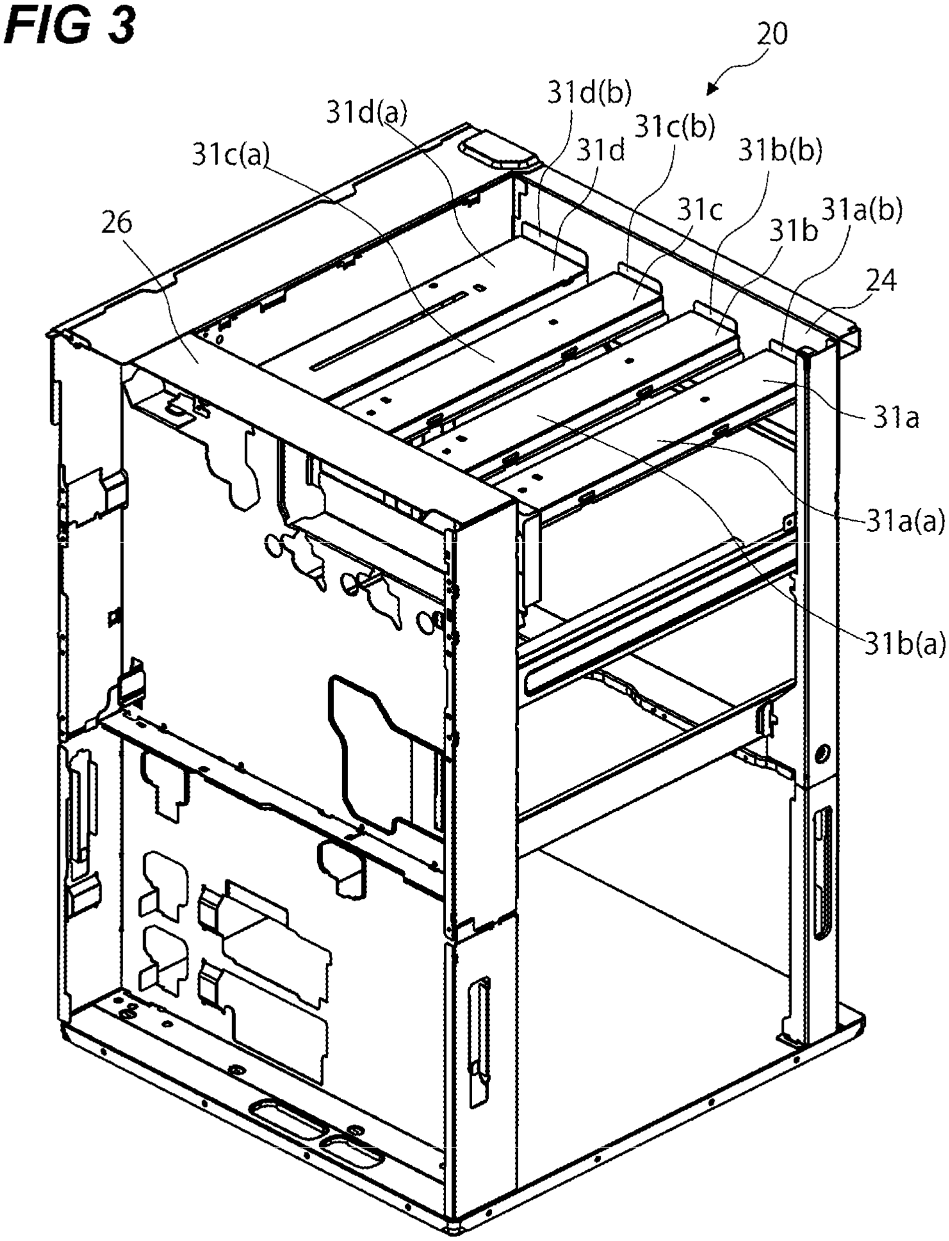
FIG. 3 is a diagram showing a perspective view of the frame according to an embodiment of the present invention, viewed from the back side of the frame in which stays and intermediate members are provided.
Figure 4:
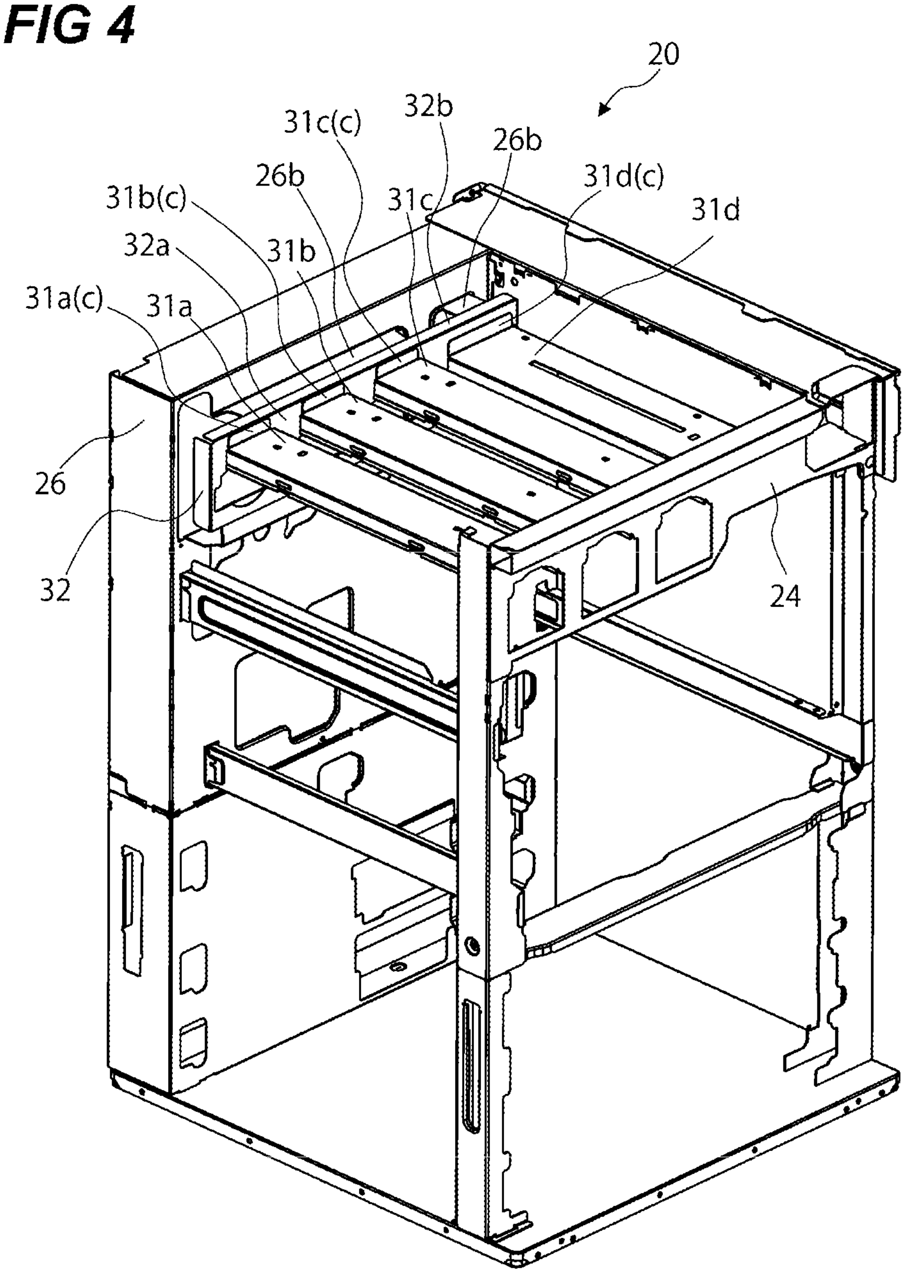
FIG. 4 is s a diagram showing a perspective view of the frame according to an embodiment of the present invention, viewed from the front side of the frame in which stays and intermediate members are provided.

FIG. 3 is a diagram showing a perspective view of the frame 20 viewed from the back side of the frame 20 in which the stays on which the optical scanning devices 1*a*, 1*b*, 1*c*, and 1*d* are respectively placed, and intermediate members are arranged. FIG. 4 is a diagram showing a perspective view of the frame 20 viewed from the front side of the frame 20 in which the stays on which the optical scanning devices 1*b*, 1*c*, and 1*d* are respectively placed, and intermediate members are arranged. In FIGS. 3 and 4, the beam member 27*b* shown in FIG. 2 is not shown in order for the stays and intermediate members to be viewed clearly.

The stays 31*a*, 31*b*, 31*c*, and 31*d* as placing members shown in FIGS. 3 and 4 are made of steel plates and the optical scanning devices 1*a*, 1*b*, 1*c*, and 1*d* shown in FIG. 1 are respectively placed on the stays 31*a*, 31*b*, 31*c*, and 31*d*.

The stay 31*a* includes the vertical surface portion 31*a*(*b*) that is approximately perpendicular to the plane 31*a*(*a*) on which the optical scanning device 1*a* is placed. The opposite side is similarly equipped with the vertical surface portion 31*a*(*c*) that is approximately perpendicular to the plane 31*a*(*a*).

The intermediate member 32 as a connecting member is formed of a steel plate. The intermediate member 32 includes the plane portion 32*b* described above, which is a plane extending in a direction perpendicular to the vertical direction, and the vertical surface portion 32*a*, which is a plane extending in the vertical direction formed by being bent at an approximately right angle to the plane portion 32*b*. In this embodiment, the intermediate member 32 is configured as one piece to which all stays 31*a*, 31*b*, 31*c*, and 31*d* are attached, considering ease of assembly, but the intermediate member may be provided for each stay.

The vertical surface portion 31*a* (*b*) of the stay 31*a* is fastened and fixed to the front side plate 24.

The vertical surface portion 31*a* (*c*) of the stay 31*a* is fastened and fixed to the vertical surface portion 32*a* of the intermediate member 32.

The plane portion 32*b* of the intermediate member 32 is fastened and fixed to the plane portion 26*b* of the rear side plate 26.

Figure 5:
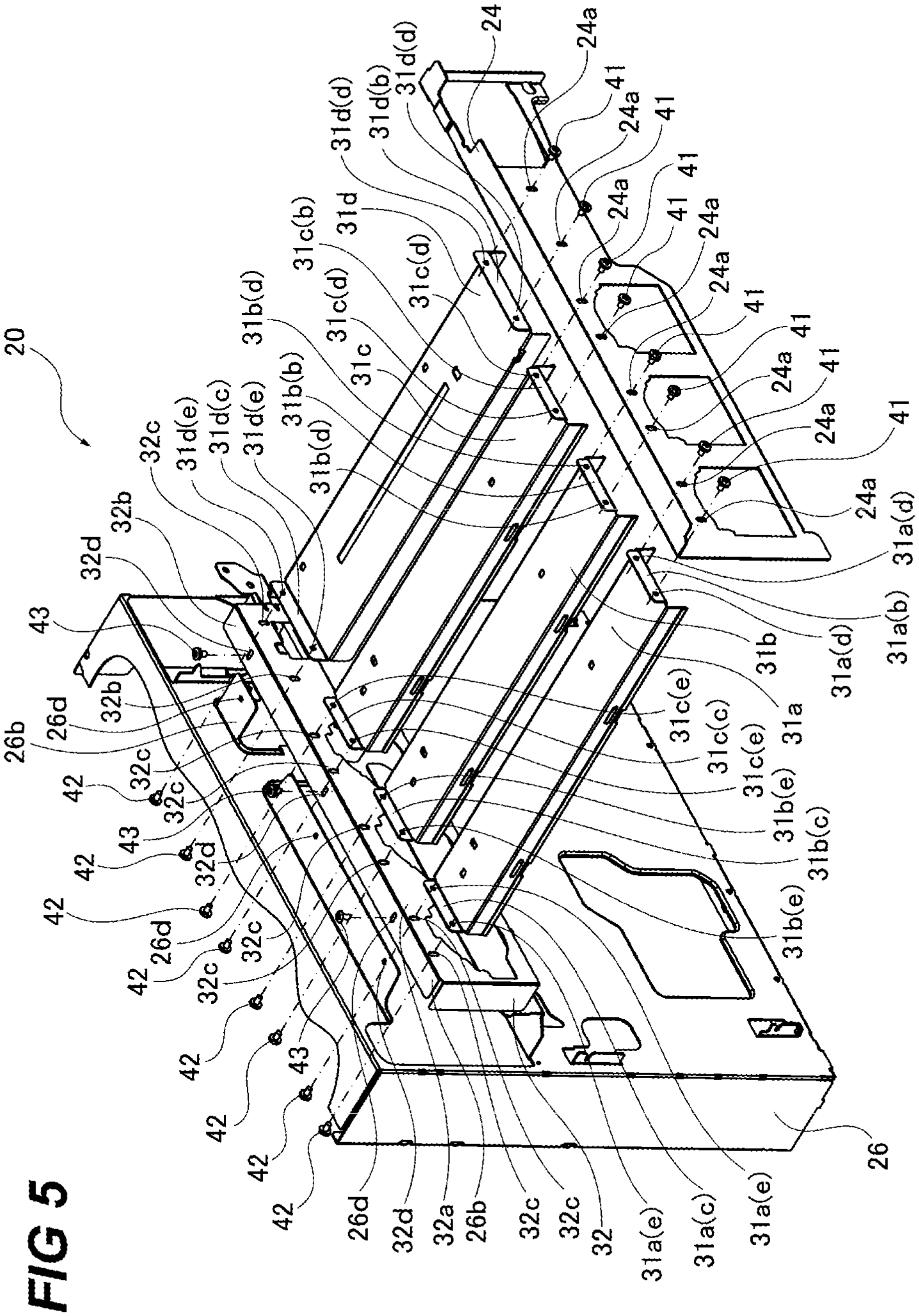
FIG. 5 is a diagram showing an exploded perspective view of the frame, indicating the configuration of stays and intermediate members fastened and fixed to the frame.

FIG. 5 is a diagram showing an exploded perspective view of the frame 20, indicating the configuration of those members fastened and fixed.

In FIG. 5, the elongated holes 24*a* extending in the vertical direction are formed on the front side plate 24. The position of the stay 31*a* is adjusted, by a tool described below, in the vertical direction such that a distance between the center of rotation of the photosensitive drum 2*a* in FIG. 1 and the optical scanning device 1*a* to be placed becomes the desired distance. At this adjusted position, the screws 41 pass through the elongated holes 24*a* and screw with the holes 31*a*(*d*) on the vertical surface portion 31*a*(*b*) of the stay 31*a*, where screw threads are formed. As a result, the vertical surface portion 31*a*(*b*) of the stay 31*a* is fastened and fixed to the front side plate 24.

The elongated holes 32*c* as a vertical surface portion adjusting portion extending in the vertical direction are formed on the vertical surface portion 32*a* of the intermediate member 32. The position of the stay 31*a* is adjusted, by a tool described below, in the vertical direction such that a distance between the center of rotation of the photosensitive drum 2*a* shown in FIG. 1 and the optical scanning device 1*a* to be placed becomes the desired distance. At this adjusted position, the screws 42 pass through the elongated holes 32*c* and screw with the holes 31*a*(*e*) on the vertical surface portion 31*a*(*c*) of the stay 31*a*, where screw threads are formed. As a result, the vertical surface portion 31*a*(*c*) of the stay 31*a* is fastened and fixed to the vertical surface portion 32*a* of the intermediate member 32.

The plane portion 32*b* of the intermediate member 32 includes the elongated holes 32*d* as a plane portion adjusting portion extending in the front-back directions. When fastening and fixing the vertical surface portion 32*a* of the intermediate member 32 to the vertical surface portion 31*a*(*c*) of the stay 31, the screws 43 pass through the elongated holes 32*d* at the position where the intermediate member 32 slides such that the stay 31 is not deformed, and screws 43 screw with the holes 26*d* on the plane portion 26*b* of the rear side plate 26, where the screw threads are formed. As a result, the plane portion 32*b* of the intermediate member 32 is fastened and fixed to the plane portion 26*b* of the rear side plate 26.

In the same way as the stay 31*a*, the stays 31*b*, 31*c*, and 31*d* are fastened and fixed to the front side plate 24 and the intermediate member 32, so that the corresponding configurations are marked with the corresponding reference characters and the description for these stays is omitted.

Next, the assembly procedure of the stay 31*a* and the intermediate member 32 will be described with reference to FIGS. 6A to 6E.

FIGS. 6A to 6E illustrate the assembly procedure of the stay 31*a* and the intermediate member 32.

Figure 6A:
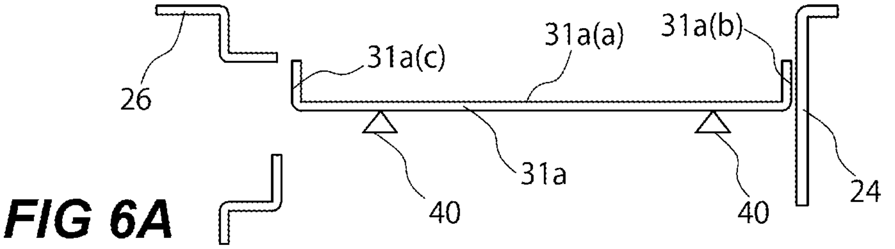
FIGS. 6A to 6E are diagrams for describing the assembly procedure of a stay and an intermediate member according to the first embodiment of the present invention.

In FIG. 6A, as the first step, an unshown tool with which the distance setting between the center of rotation of the photosensitive drum 2*a* in FIG. 1 and the plane 31*a*(*a*) of the stay 31*a* is realized with high accuracy is set to the frame.

As the second step, the stay 31*a* is placed on the tool, as shown in FIG. 6A. In FIG. 6A, the placing surface is schematically indicated by the upward triangle 40.

Figure 6B:
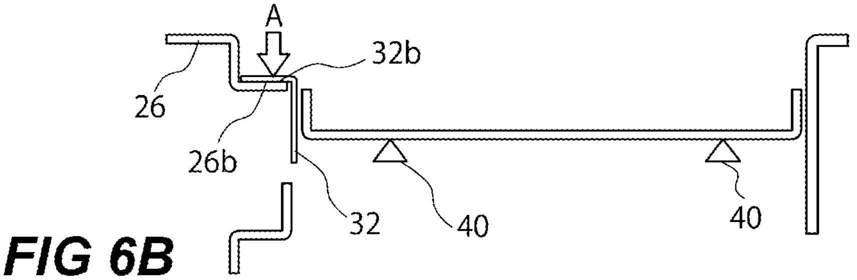

As the third step, as shown in FIG. 6B, the plane portion 32*b* of the intermediate member 32 is set on the plane portion 26*b* of the rear side plate 26, and a force is applied to the plane portion 32*b* of the intermediate member 32 in the direction of the arrow A such that the plane portion 32*b* can slide on the plane portion 26*b* of the rear side plate 26.

Figure 6C:
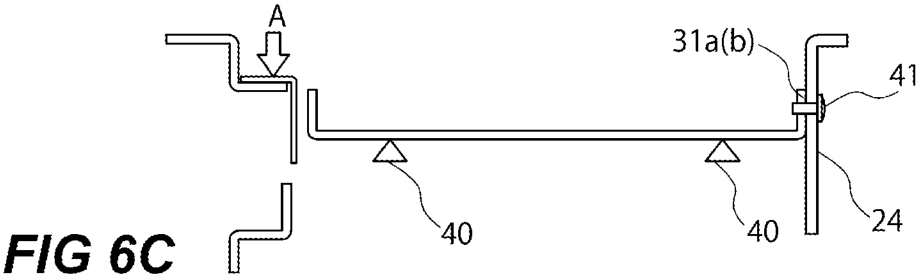

As the fourth step, as shown in FIG. 6C, the vertical surface portion 31*a*(*b*) of the stay 31*a* is fastened and fixed to the front side plate 24 with the screws 41 such that the vertical surface portion 31*a*(*b*) is pulled to the front side plate 24.

Figure 6D:
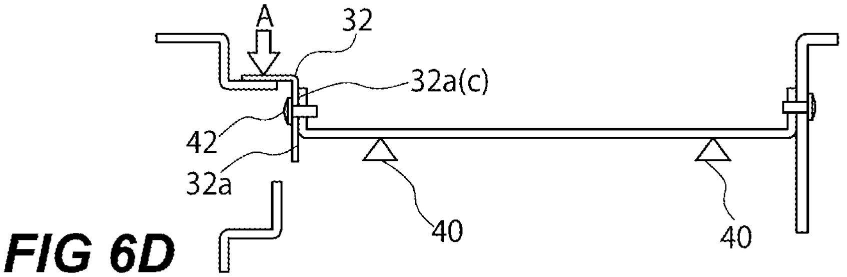

As the fifth step, as shown in FIG. 6D, the vertical surface portion 32*a* of the intermediate member 32 is fastened and fixed to the vertical surface portion 31*a*(*c*) of the stay 31*a* with screws 42 such that the vertical surface portion 32*a* is pulled to the vertical surface portion 31*a*(*c*) of the stay 31*a*.

Figure 6E:
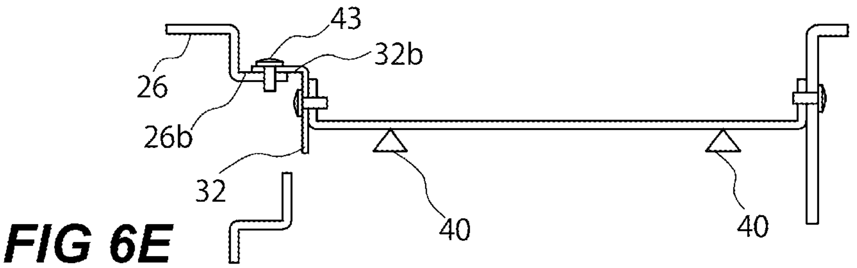

As the sixth step, as shown in FIG. 6E, the plane portion 32*b* of the intermediate member 32 is fastened and fixed to the plane portion 26*b* of the rear side plate 26 with the screws 43 at the position where the intermediate member 32 slides such that the stay 31*a* is not deformed by the fifth step in which the vertical surface portion 32*a* of the intermediate member 32 is fastened and fixed to the vertical surface portion 31*a*(*c*) of the stay 31*a*.

With the above procedure, it is possible to precisely set the distance between the photosensitive drum 2*a* and the optical scanning device 1*a* while suppressing the deformation of the stay 31*a*.

The stays 31*b*, 31*c*, and 31*d* are assembled in the same manner as the assembly of stay 31*a* as shown in FIGS. 6A to 6E.

In this embodiment, the intermediate member 32 is configured to be fastened and fixed with the screws to the rear side plate 26. However, the same effect can be obtained by forming a plane portion on the front side plate 24 and fastening and fixing it to the intermediate member 32 in the opposite configuration.

Next, the second embodiment of the present invention will be described in terms of the configuration and assembly procedure of a stay and an intermediate member using FIGS. 7A to 7D. The configurations of the other components are the same as those shown in the above-described first embodiment, and the detailed descriptions are omitted by attaching the same reference characters to the members that have the same configurations or the same effects and by referring to the corresponding description of the first embodiment.

FIGS. 7A to 7D illustrate the assembly procedure of a stay and an intermediate member.

The stay 33*a* shown in FIGS. 7A to 7D which corresponds to the stay 31*a* shown in FIGS. 3 and 4 is made of a steel plate and the optical scanning device 1*a* is placed on the stay 33*a*.

The stay 33*a* includes the vertical surface portion 33*a*(*b*) that is approximately perpendicular to the plane 33*a*(*a*) on which the optical scanning device 1*a* is placed. The opposite side is equipped with the plane portion 33*a*(*c*) that extends from the plane 33*a*(*a*).

The vertical surface portion 33*a*(*b*) of the stay 33*a* is provided with a hole on which a screw thread is formed as in the first embodiment. The position of the stay 33*a* is adjusted, by a tool described below, in the vertical direction such that a distance between the center of rotation of the photosensitive drum 2*a* in FIG. 1 and the optical scanning device 1*a* to be placed becomes the desired distance. At this adjusted position, the screws 46 pass through the elongated holes on the front side plate 24 and screw with the holes on the vertical surface portion 33*a*(*b*) of the stay 33*a*. As a result, the vertical surface portion 33*a* (*b*) of the stay 33*a* is fastened and fixed to the front side plate 24.

The intermediate member 34, which corresponds to the intermediate member 32 in FIG. 4, is formed of a steel plate and includes the vertical surface portion 34*a*, which is a plane extending in the vertical direction, and the plane portion 34*b*, which is formed by being bent at an approximately right angle to the vertical surface portion 34*a*.

The elongated holes as a vertical surface portion adjusting portion extending in the vertical direction are formed on the vertical surface portion 26*c* of the rear side plate 26. The position of the stay 33*a* is adjusted, by a tool described below, in the vertical direction such that a distance between the center of rotation of the photosensitive drum 2*a* shown in FIG. 1 and the optical scanning device 1*a* to be placed becomes the desired distance. At this adjusted position, the screws 47 pass through the elongated holes formed on the vertical surface portion 26*c* of the rear side plate 26 and screw with the holes 31*a* on the vertical surface portion 34*a* of the intermediate member 34, where screw threads are formed. As a result, the vertical surface portion 34*a* of the intermediate member 34 is fastened and fixed to the vertical surface portion 26*c* of the rear side plate 26.

The plane portion 33*a*(*c*) of the stay 33*a* includes the elongated holes as a plane portion adjusting portion extending in the front-back directions. When fastening and fixing the vertical surface portion 34*a* of the intermediate member 34 to the vertical surface portion 26*c* of the rear side plate 26, the screws 48 pass through the elongated holes formed on the plane portion 33*a*(*c*) of the stay 33*a* at the position where the intermediate member 34 slides such that the stay 33 is not deformed, and the screws 48 screw with the holes on the plane portion 34*b* of the intermediate member 34, where the screw threads are formed. As a result, the plane portion 34*b* of the intermediate member 34 is fastened and fixed to the plane portion 33*a*(*c*) of the stay 33*a*.

Next, the assembly procedure of the stay 33*a* and the intermediate member 34 will be described.

As the first step, an unshown tool with which the distance setting between the center of rotation of the photosensitive drum 2*a* in FIG. 1 and the plane 33*a*(*a*) of the stay 33*a* is realized with high accuracy is set to the frame.

Figure 7A:
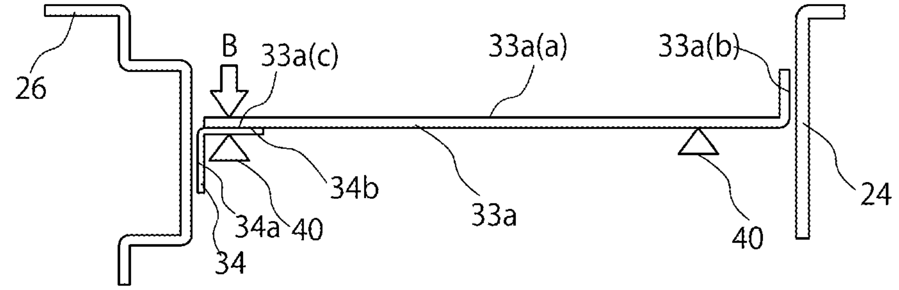
FIGS. 7A, 7B, 7C, and 7D are diagrams for describing the assembly procedure of the stay and the intermediate member according to the second embodiment of the present invention.

As the second step, as shown in FIG. 7A, the stay 31*a* and the intermediate member 34 are placed on the tool, and a force is applied to the plane portion 33*a*(*c*) of the stay 33*a* in the direction of the arrow B such that the plane portion 33*a*(*c*) of the stay 31*a* can slide on the plane portion 34*b* of the intermediate member.

Figure 7B:
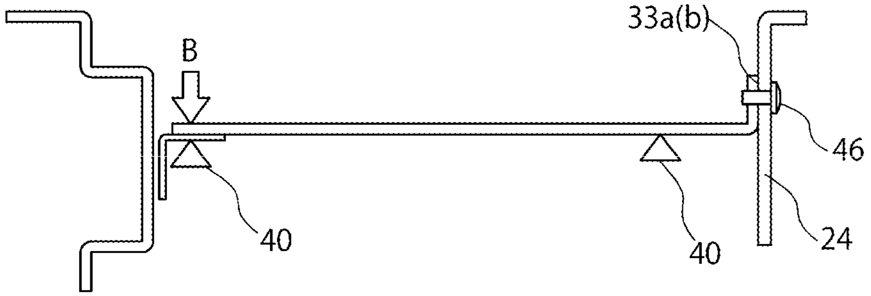

As the third step, as shown in FIG. 7B, the vertical surface portion 33*a*(*b*) of the stay 33*a* is fastened and fixed to the front side plate 24 with the screws 46 such that the vertical surface portion 33*a*(*b*) is pulled to the front side plate 24.

Figure 7C:
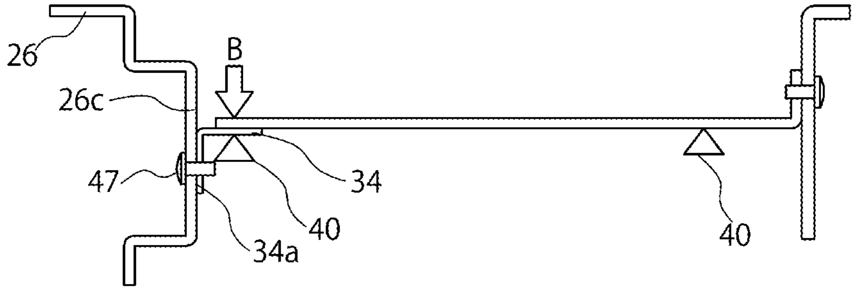

As the fourth step, as shown in FIG. 7C, the vertical surface portion 34*a* of the intermediate member 34 is fastened and fixed to the vertical surface portion 26*c* of the rear side plate 26 with screws 47 such that the vertical surface portion 34*a* of the intermediate member 34 is pulled to the vertical surface portion 34*a*.

Figure 7D:
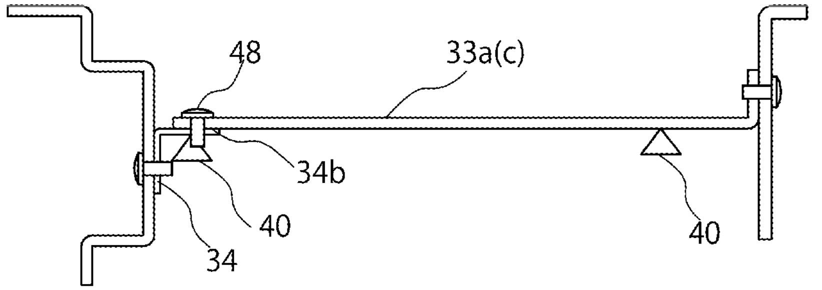

As the fifth step, as shown in FIG. 7D, the plane portion 34*b* of the intermediate member 34 is fastened and fixed to the plane portion 33*a*(*c*) of the stay 33*a* with the screws 48 at the position where the intermediate member 34 slides such that the stay 33*a* is not deformed by the fourth step in which the vertical surface portion 34*a* of the intermediate member 34 is fastened and fixed to the vertical surface portion 26*c* of the rear side plate 26.

The screws 46, 47, and 48 are respectively arranged in plurality along the direction perpendicular to the surface of the paper surfaces of the FIGS. 7B, 7C and 7D.

With the above procedure, it is possible to precisely set the distance between the photosensitive drum and the optical scanning device while suppressing the deformation of the stay 33*a*.

The stays corresponding to the stays 31*b*, 31*c*, and 31*d* shown in FIGS. 3 and 4 are assembled in the same manner as the assembly of the stay 33*a* as shown in FIGS. 7A to 7D.

In this embodiment, the intermediate member 34 is configured to be fastened and fixed with the screws to the rear side plate 26. However, the same effect can be obtained by the configuration in which the intermediate member 34 is fastened and fixed to the front side plate 24.

Next, the third embodiment of the present invention will be described in terms of the configuration and the assembly procedure of stays and intermediate members using FIGS. 8A to 8D. The configurations of the other components are the same as those shown in the above-described first embodiment, and the detailed description is omitted by referring to the corresponding description and attaching the same reference characters to the members that have the same configurations or the same effects and by referring to the corresponding descriptions of the first embodiment.

FIGS. 8A to 8D illustrate the assembly procedure of a stay and an intermediate member.

Figure 8A:
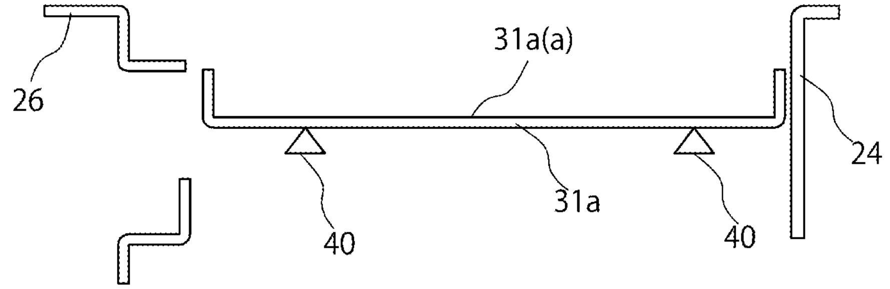
FIGS. 8A, 8B, 8C, and 8D are diagrams for describing the assembly procedure of a stay and an intermediate member according to the third embodiment of the present invention.

In FIG. 8A, as the first step, an unshown tool with which the distance setting between the center of rotation of the photosensitive drum 2*a* and the plane 31*a*(*a*) of the stay 31*a* is realized with high accuracy is set to the frame.

As the second step, the stay 31*a* is placed on the tool, as shown in FIG. 8A.

Figure 8B:
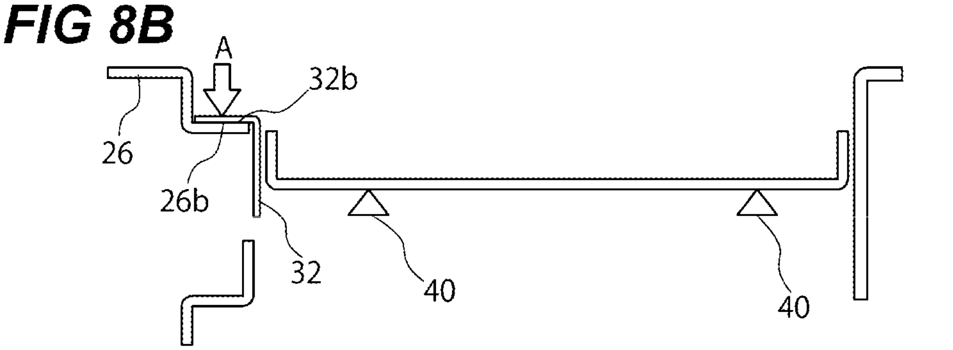

As the third step, as shown in FIG. 8B, the plane portion 32*b* of the intermediate member 32 is set on the plane portion 26*b* of the rear side plate 26 and a force is applied to the plane portion 32*b* of the intermediate member 32 in the direction of the arrow A such that the plane portion 32*b* of the intermediate member 32 can slide on the plane portion 26*b* of the rear side plate 26 and the gap between the plane portion 32*b* and the plane portion 26*b* becomes less than or equal to 0.3 mm.

Figure 8C:
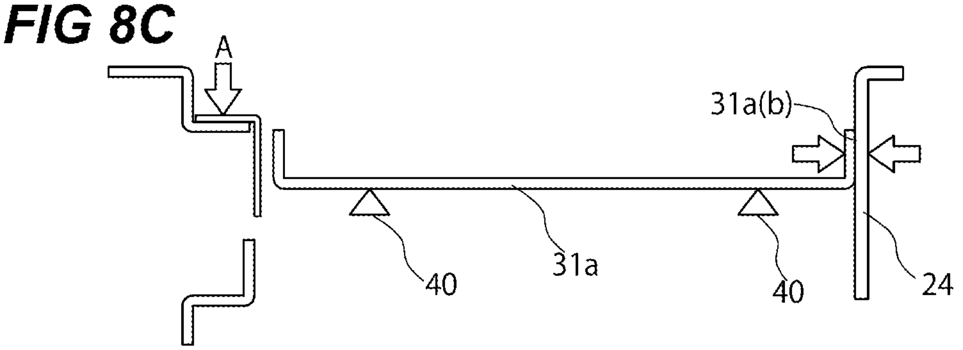

As the fourth step, as shown in FIG. 8C, the vertical surface portion 31*a*(*b*) of the stay 31*a* and the front side plate 24 are clamped such that the gap between the vertical surface portion 31*a*(*b*) and the front side plate 24 becomes less than or equal to 0.3 mm.

The clamping is indicated schematically by opposing arrows.

Figure 8D:
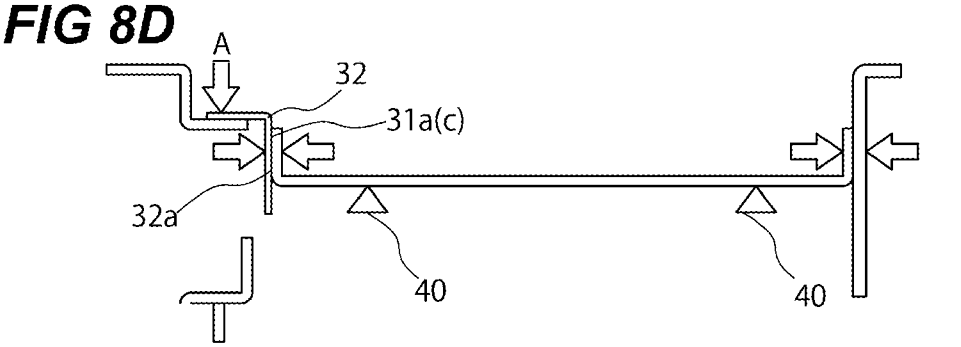

As the fifth step, as shown in FIG. 8D, the vertical surface portion 32*a* of the intermediate member 32 and the vertical surface portion 31*a*(*c*) of the stay 31*a* are clamped such that the gap between the vertical surface portion 32*a* and the vertical surface portion 31*a*(*c*) becomes less than or equal to 0.3 mm.

As the sixth step, the intermediate member and the stay are fastened and fixed to each other to be integrated with the frame by welding the location which the arrow A indicates and its vicinity and by welding the location of the clamping and its vicinity.

With the above procedure, it is possible to precisely set the distance between the photosensitive drum 2*a* and the optical scanning device 1*a* while suppressing the deformation of the stay.

The stays 31*b*, 31*c*, and 31*d* are assembled in the same manner as the assembly of stay 31*a* as shown in FIGS. 8A to 8D.

In this embodiment, the intermediate member 32 is configured to be welded to the rear side plate 26. However, the same effect can be obtained by forming a plane portion on the front side plate 24, performing the fastening and fixing of the stay 31*a* to the intermediate member 32 at the opposite side, and welding the intermediate member 32 to the plane portion of the front side plate 24.

In addition, by fastening and fixing the vertical surface portions by welding, it is possible to eliminate concerns raised when using the fastening and fixing by screws about misalignment caused by vertical shocks that could occur during the transportation of the apparatus.

Next, the fourth embodiment of the present invention will be described in terms of the configuration and the assembly procedure of a stay and an intermediate member using FIGS. 9A to 9C. The configurations of the other components are the same as those shown in the above-described second embodiment, and the detailed description is omitted by referring to the corresponding description and attaching the same reference characters to the members that have the same configurations or the same effects and by referring to the corresponding descriptions of the second embodiment.

Figure 9A:
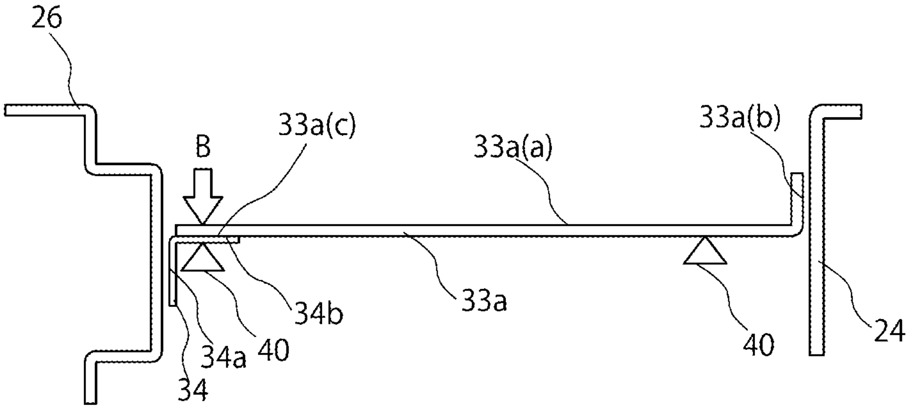
FIGS. 9A, 9B, and 9C, are diagrams for describing the assembly procedure of a stay and an intermediate member according to the fourth embodiment of the present invention.
Figure 9B:
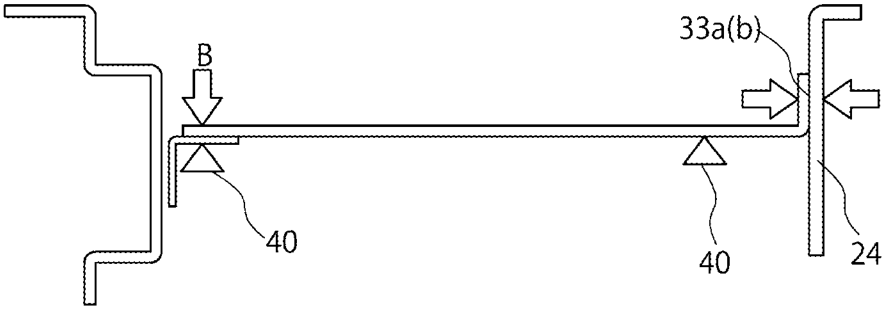
Figure 9C:
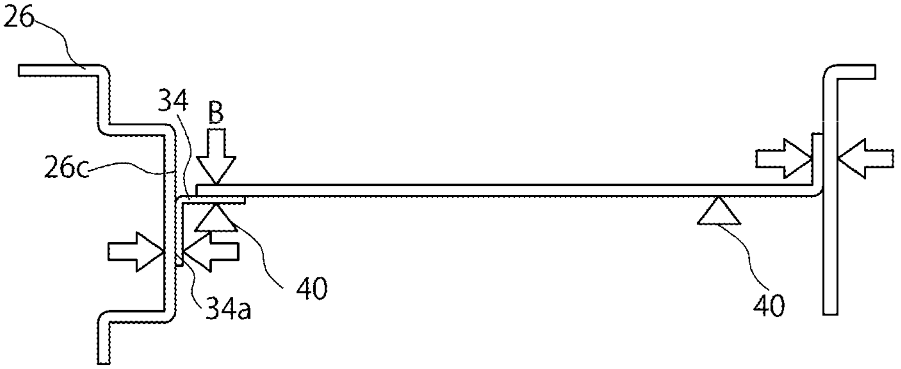

FIGS. 9A to 9C illustrate the assembly procedure of a stay and an intermediate member.

In FIG. 9A, as the first step, an unshown tool with which the distance setting between the center of rotation of the photosensitive drum 2*a* and the plane 33*a*(*a*) of the stay 33*a* is realized with high accuracy is set to the frame.

As the second step, as shown in FIG. 9A, the intermediate member 34 and the stay 33*a* are placed on the tool and a force is applied to the plane portion 33*a*(*c*) of the stay 33*a* in the direction of the arrow B such that the plane portion 33*a*(*c*) of the stay 33*a* can slide on the plane portion 34*b* of the intermediate member 34 and the gap between the plane portion 33*a*(*c*) of the stay 33*a* and the plane portion 34*b* of the intermediate member 34 becomes less than or equal to 0.3 mm.

As the third step, as shown in FIG. 9B, the vertical surface portion 33*a*(*b*) of the stay 33*a* and the front side plate 24 are clamped such that the gap between the vertical surface portion 33*a*(*b*) and the front side plate 24 becomes less than or equal to 0.3 mm.

As the fourth step, as shown in FIG. 9C, the vertical surface portion 34*a* of the intermediate member 34 and the vertical surface portion 26*c* of the rear side plate 26 are clamped such that the gap between the vertical surface portion 34*a* and the vertical surface portion 26*c* becomes less than or equal to 0.3 mm.

As the fifth step, the intermediate member and the stay are fastened and fixed to each other to be integrated with the frame by welding the location which the arrow B indicates and its vicinity, and by welding the location of the clamping and its vicinity.

With the above procedure, it is possible to precisely set the distance between the photosensitive drum 2*a* and the optical scanning device 1*a* while suppressing the deformation of the stay 33*a*.

The stays corresponding to the stays 31*b*, 31*c*, and 31*d* shown in FIGS. 3 and 4 are assembled in the same manner as the assembly of stay 33*a* as shown in FIGS. 9A to 9C.

In this embodiment, the intermediate member 34 is configured to be welded to the rear side plate 26. However, the same effect can be obtained by welding the intermediate member 34 to the front side plate 24.

Next, the fifth embodiment of the present invention will be described in terms of the configuration and the assembly procedure of a stay and an intermediate member using FIGS. 10A and 10B. The configurations of the other components are the same as those shown in the above-described first embodiment, and the detailed description is omitted by referring to the corresponding description and attaching the same reference characters to the members that have the same configurations or the same effects and by referring to the corresponding description of the first embodiment.

Since the intermediate member 32 shown in FIGS. 6A to 6E of the first embodiment is cantilevered, the vibration of the drive motor or other components of the optical scanning device 1 may cause image defects if the vibration is large during the image formation.

In such a case, the implementation of this embodiment can suppress image defects caused by the vibration.

Figure 10A:
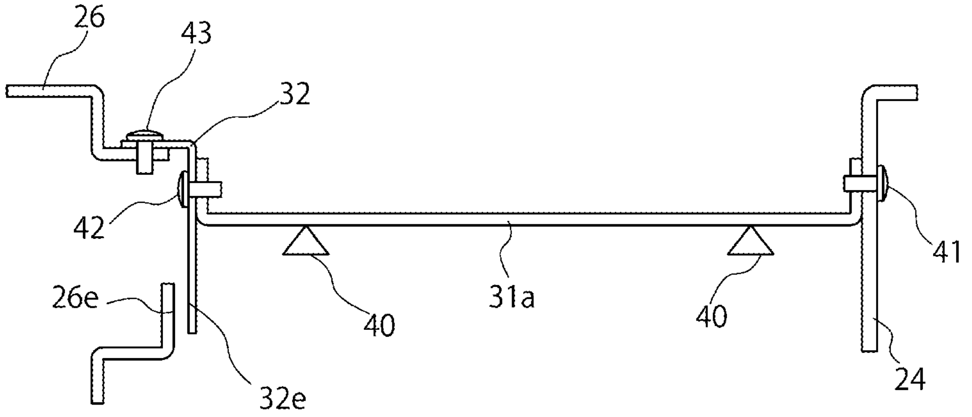
FIGS. 10A, and 10B, are diagrams for describing the assembly procedure of a stay and an intermediate member according to the fifth embodiment of the present invention.
Figure 10B:
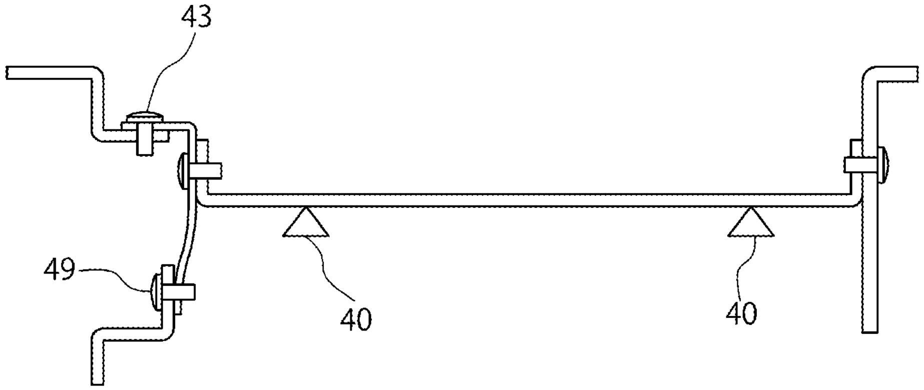
Figure 11:
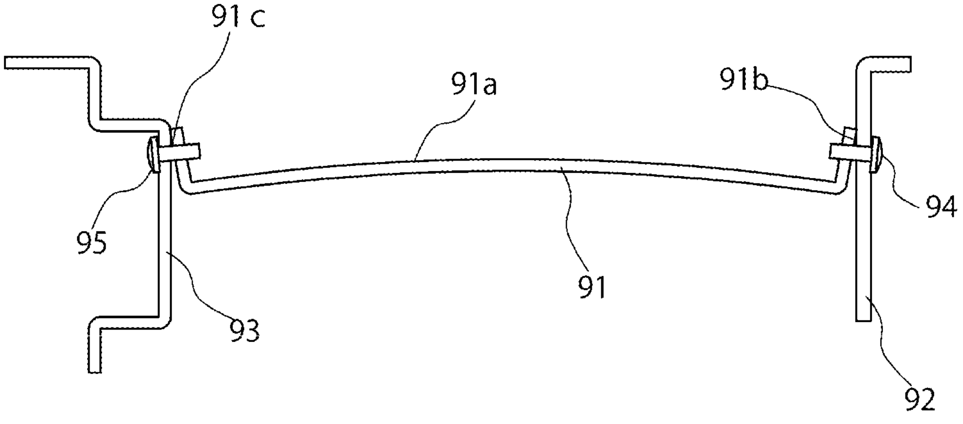
FIG. 11 is a diagram for describing the assembly configuration of a conventional stay.

FIGS. 10A and 10B illustrate the assembly procedure of a stay and an intermediate member.

The state shown in FIG. 10A is the same as that advanced to the sixth step shown in FIG. 6E.

The intermediate member 32 includes the vertical surface portion 32*e* which extends from the vertical surface portion 32*a* of FIG. 6 in the downward direction.

The rear side plate 26 includes the vertical surface portion 26*e* formed by being bent from the upright surface portion 26*a*.

As a seventh step, as shown in FIG. 10B, the vertical surface portion 32*e* of the intermediate member 32 is fastened and fixed to the vertical surface portion 26*e* of the rear side plate 26 with screws 49 such that the vertical surface portion 32*e* of the intermediate member 32 is pulled to the vertical surface portion 26*e* of the rear side plate 26 on the opposite side of the screws 43.

By forming the intermediate member 32 with a steel plate thinner than the stay 31*a*, it is possible to suppress the deformation of the stay 31*a* when fastening and fixing the intermediate member 32 to the rear side plate 26, and to precisely set the distance between the photosensitive drum 2*a* and the optical scanning device 1*a*.

The screws 49 are arranged in plurality along the direction perpendicular to the paper surface of FIG. 10B.

The stays 31*b*, 31*c*, and 31*d* are assembled in the same manner as the assembly of stay 31*a* as shown in FIGS. 10A and 10B.

In this embodiment, the same effect can be obtained by the configuration in which the fastening and the fixing of the front side plate 24 and the rear side plate 26 to the intermediate member 32 in the opposite configuration.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2022-051622, filed Mar. 28, 2022, which is hereby incorporated by reference herein in its entirety.

What is claimed is:

1. An image forming apparatus comprising:

an optical scanning portion which forms an electrostatic latent image on a photosensitive body;

a placing member on which the optical scanning portion is placed;

a first supporting member to which the placing member is fixed;

a second supporting member opposite the first supporting member across the placing member; and a connecting member which connects the second supporting member and the placing member, the connecting member including a first surface which is fixed to the second supporting member and a second surface which is bent at an approximately right angle with respect to the first surface and is fixed to the placing member.

2. The image forming apparatus according to claim 1, wherein the first surface of the connecting member is a plane extending in a vertical direction.

3. The image forming apparatus according to claim 1, wherein the first surface of the connecting member is a plane extending in a direction perpendicular to a vertical direction.

4. The image forming apparatus according to claim 1, further comprising:

an adjusting portion for the first surface by which a fixing position of the first surface of the connecting member to the second supporting member is adjustable.

5. The image forming apparatus according to claim 1, further comprising:

an adjusting portion for the second surface by which a fixing position of the second surface of the connecting member to the placing member is adjustable.

6. The image forming apparatus according to claim 1, wherein the placing member is configured with a steel plate and the connecting member is configured with a steel plate which is thinner than the placing member.

7. The image forming apparatus according to claim 1, wherein at least the second surface of the connecting member is fixed by welding.

8. The image forming apparatus according to claim 1, wherein a side of the placing member, which is fixed to the first supporting member has a surface bent at an approximately right angle with respect to the first surface of the connecting member.

9. The image forming apparatus according to claim 1, wherein the second supporting member is located rearward of the first supporting member in the front and back directions of the image forming apparatus.

* * * * *